April 28, 1959 L. A. RUNTON Re. 24,643

RAILWAY JOURNAL PACKING

Original Filed July 17, 1956 2 Sheets-Sheet 1

INVENTOR
LESLIE A. RUNTON
BY
ATTORNEY

April 28, 1959 L. A. RUNTON Re. 24,643

RAILWAY JOURNAL PACKING

Original Filed July 17, 1956 2 Sheets-Sheet 2

INVENTOR
LESLIE A. RUNTON.
BY
ATTORNEY

United States Patent Office

Re. 24,643

Reissued Apr. 28, 1959

24,643

RAILWAY JOURNAL PACKING

Leslie A. Runton, Middle Haddam, Conn., assignor to The Russell Manufacturing Company, Middletown, Conn., a corporation of Connecticut Original No. 2,827,346, dated March 18, 1958, Serial No. 598,379, July 17, 1956. Application for reissue May 1, 1958, Serial No. 735,081

8 Claims. (Cl. 308—243)

Matter enclosed in heavy brackets [ ] appears in the original patent but forms no part of this reissue specification; matter printed in italics indicates the additions made by reissue.

This invention relates to journal box packing for railway cars and particularly for freight cars having a journal box for oil which is fed to the bearing by the wicking action of the packing.

An object is to provide a textile packing pad for the above purpose having novel and improved characteristics.

Another object is to provide such a pad made from textile products, which has improved wicking properties, retains its form and resilience after long periods of use, effectively utilizes all of the oil in a standard journal box, and is easily inserted or removed.

Other objects and advantages will be apparent as the nature of the invention is more fully disclosed.

The invention will be better understood from the following description taken in connection with the accompanying drawings in which a specific embodiment has been set forth for purposes of illustration.

Figure 2:
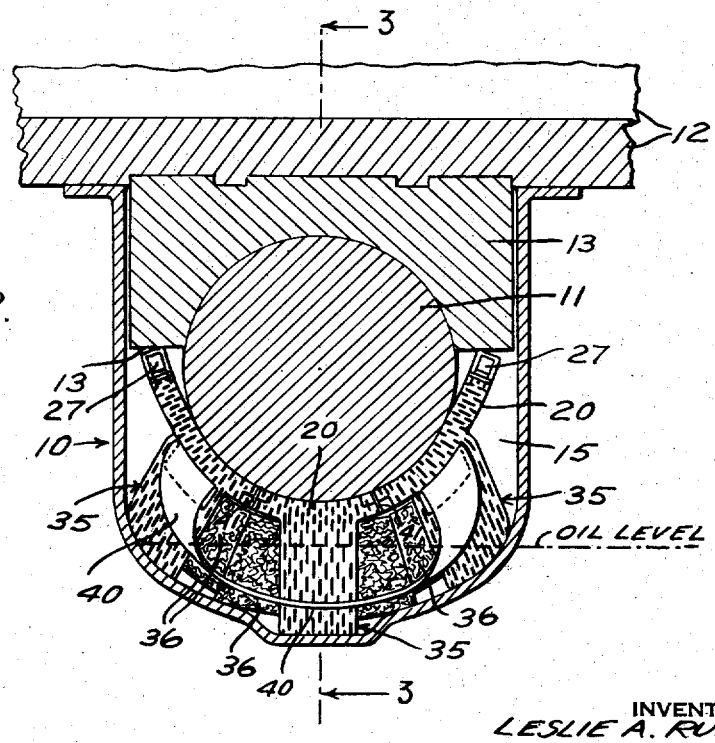
Fig. 2 is a transverse vertical section through a journal box showing the present pad in place.
Figure 3:
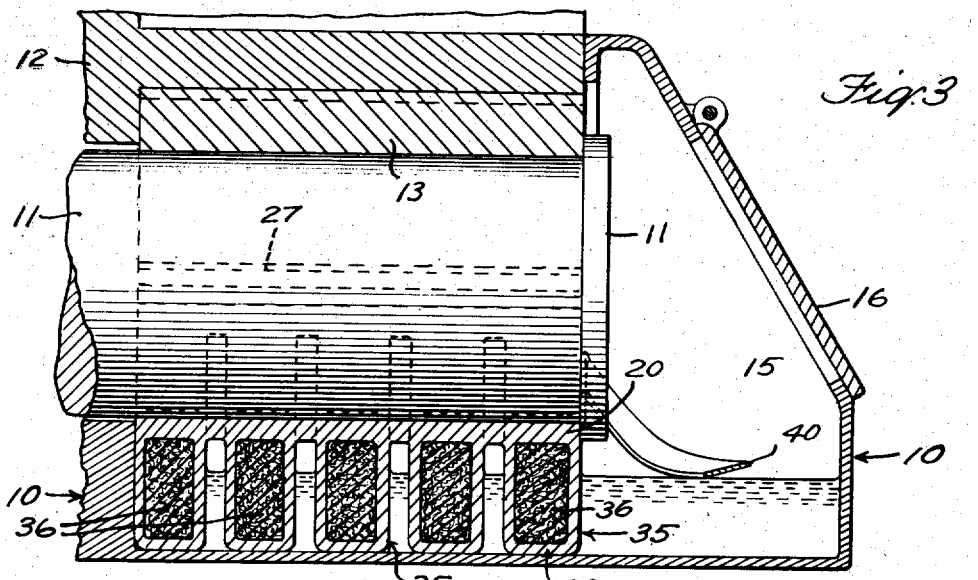
Fig. 3 is a longitudinal section taken on the line 3—3 of Fig. 2.

Referring to Figs. 2 and 3 the invention is shown in connection with a journal box 10 for oiling a journal 11 on which a car frame 12 is supported by a bearing 13. The journal box 10 includes walls forming an oil reservoir 15 and an end door 16 through which the packing is inserted or removed. The journal box is of a standard type commonly used on freight cars.

Figure 5:
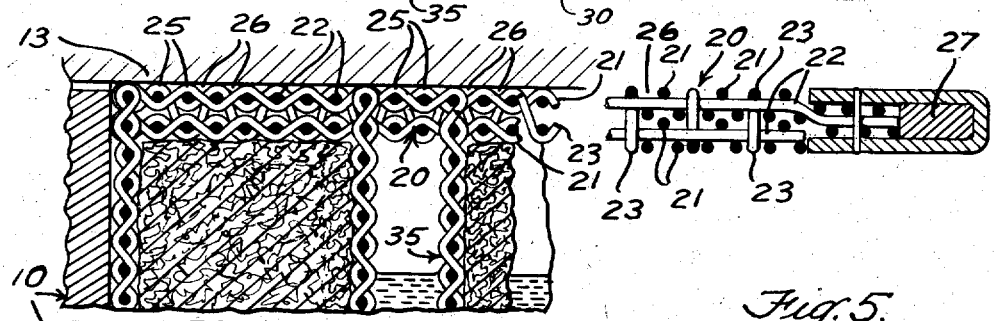
Fig. 5 is a detail view illustrating the weave of the pad.
Figure 4:
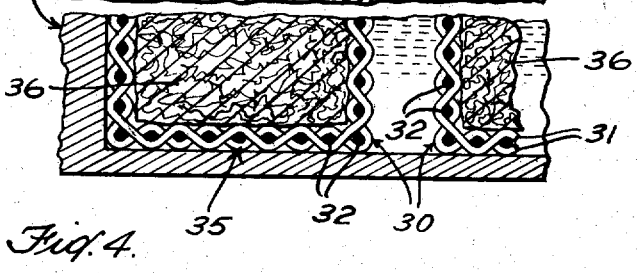
Fig. 4 is an enlarged fragmentary section showing the construction of the pad.
Figure 6:
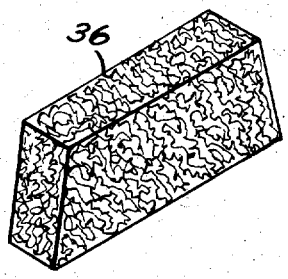
Fig. 6 is a perspective view of a wicking plug used in the present pad.

The packing pad in accordance with the present invention comprises a woven fabric backing 20 which is adapted to conform to the contour of the journal 11. This backing 20 may be made in one or more plies. As shown in Figs. 4 and 5 the backing consists of two plies, each formed by interwoven warps 21 and fillers 22, the two plies being bound together by binder warps 23.

It will be noted that the upper exposed surface of the backing 20 includes ridges 25 where the warps 21 pass over the fillers 22 and depressions or recesses 26 in the space between fillers. These depressions serve to receive and collect solid particles or dirt which may be present and would otherwise injure the bearing or contaminate the oil. The dirt thus collected on the upper surface of the backing 20 may be removed from time to time by cleaning the pad.

The side edges of the backing 20 are provided with stiffening inserts 27 which may be made of textile woven as felted padding. These inserts 27 provide a sufficient thickness and body for the upper edges of the backing 20 to engage the under surface of the bearing 13 for positioning the pad and also to prevent the edges of the backing from being pinched between the bearing 13 and the journal 11.

In use the wear between the upper brass bearing 13 and the railroad car journal 11 embeds the journal deeper in the bearing and leaves a considerable opening at the two lower edges of the brass bearing. It may be as much as ⅛" away from the journal surface after one year's wear.

The prior method of using yarn waste for lubricating purposes causes fires when loose threads of oil-soaked cotton get into this wedge-shaped opening. This loss of a bearing in railroad parlance is called a "waste-grab." By sewing the reinforcing strip 29 onto the upper edges of the present pad, such "waste-grab" is eliminated.

Figure 1:
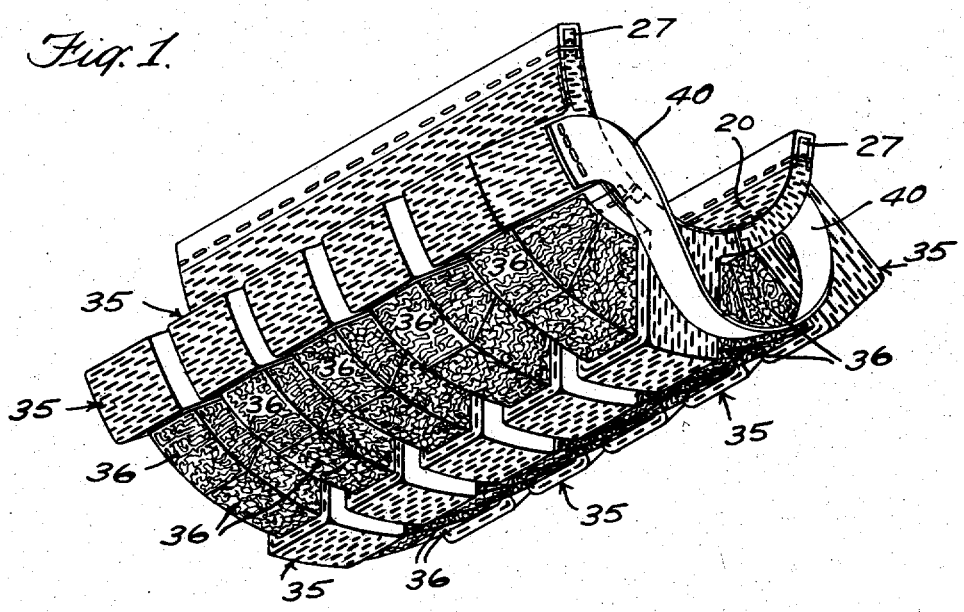
Fig. 1 is a perspective view of a journal box pad embodying the present invention.

The pad also includes a woven ply 30 which is composed of warp yarns 31 and fillers yarns 32 which is woven onto the backing 20 at spaced points and extends downwardly in loops 35 between such points. A row of such loops 35 is formed along the backing 20 as shown in Figs. 1 and 3. A series of such rows are displaced fillerwise across the backing as shown in Figs. 1 and 2.

These loops 35 are of a length to dip into the oil bath in the journal box 10 and to extend substantially to the bottom of such box. Plugs or pads 36 of absorbent or resilient material having wicking properties, such as felted wool fibers or curled or crimped hogs' hair or the like bonded into a spongy mass by neoprene or the like are inserted in the loops 35. These pads 36 are of a size to completely fill and be securely held by the individual loops and are of a length such that the plugs 36 in adjacent rows of loops are in loose contact and serve to shape the backing to the section of the journal 11 when in place in the journal box 18. The plugs 36 may be made wedge-shape for fitting and holding the backing in place. The loops of each row are spaced apart to leave a space for oil therebetween and the loops of adjacent rows which extend radially of the journal diverge at an angle to leave a wedge-shaped oil space therebetween. A hand loop 40 it attached to a pair of the end loops to provide a handle by which the entire assembly can be pulled out of the journal box and handled as a unit.

The loops 35 and backing 20 are made from yarn having wicking and non-carbonizing properties, for example spun Dacron, a polyester fiber having a basis of polyethylene terephthalate, so that the oil in the journal box 10 is absorbed by the plugs 36 and loops 35 transferred by wicking action to the backing 20 by which it is applied to the journal 11 for lubrication purposes. The lubrication effect continues, even after all of the free oil has been absorbed and in fact until all of the oil has been fed by the wicking action of the loops and backing onto the journal.

A prevalent objection to the use of cotton waste is the formation of an oxide film on the journal, composed partly of some of the softer metal from the brass stationary bearing in combination with carbon from charred parts of the cotton and sulphur molecules from the oil. This build-up on the surface of the steel journal increases the coefficient of friction and therefore the heat generated during motion. It also peels off as a scale or glaze onto the cotton pad and stops the flow of lubricating oil from the pad to the journal.

The present pad eliminates this build-up of oxide film by using Dacron which does not carbonize and can withstand high temperatures and does not serve as a bond for the molecular chain involved in creating this oxide film.

The textile pad can be readily removed and replaced and the plugs or pads 36 can be removed from the loops 35 and renewed when necessary.

The depending loops and plugs engage the bottoms of the journal box to hold the backing in pressure engagement with the journal. The construction is such that the pads 36 retain their resilience so as to maintain pressure on the backing for the entire life of the pad.

The plugs 36 are preformed from felted fibers which may be bonded so as to retain their shape and dimensions. Such a material is highly absorbent due to the air spaces therein and readily absorbs and transfers oil to the loops 35 by which it is fed to the backing.

The felted wool plugs are highly absorbent. The bonded hogs' hair pads are somewhat less absorbent but have great resilience and retain this resilience throughout their life. Such plugs serve to maintain the backing in pressure engagement with the journal. A combination of both types of plugs may be used if desired.

The backing may be woven in one piece or may be woven in plies and secured together. The backing is shown as formed in strips, each carrying a row of loops 35 and stitched together by rows of stitches 41. It may be woven as a single piece however if desired.

What is claimed is:

1. A pad for lubricating journal bearings in railway journal boxes or the like, comprising a woven backing of textile material having wicking properties adapted to bear against the exposed surface of the journal, a plurality of rows of spaced loops of textile material having wicking properties depending from said backing, said rows of loops being parallel to each other, the loops of each row being in alignment with each other in a horizontal plane and spaced apart to provide an oil space therebetween with the openings in said loops transverse to the alignment of the loops, and a separate plug of fibrous material disposed in and carried by each of said loops, said plugs being resilient and being adapted to hold said backing in pressure engagement with said journal whereby oil from said journal box is absorbed by said plugs and loops and transferred by wicking action through said loops to said backing by which it is applied to said journal for lubricating said bearing, the construction and arrangement of said pad being such that when the same is inserted in the journal box each of the said rows of loops extends longitudinally of the journal with the openings of said loop extending transversely of the journal axis and the loops projecting radially of the journal whereby the loops of adjacent rows are angularly displaced relatively to each other to provide an oil space therebetween.

2. A lubricating pad as set forth in claim 1 in which said loops are woven into said backing.

3. A lubricating pad as set forth in claim 1 in which said backing and said loops are composed of spun yarn comprising a polyester filamentary material having a basis of polyethylene terephthalate.

4. A lubricating pad as set forth in claim 1 in which said plugs are composed of felted wool fibers.

5. A lubricating pad as set forth in claim 1 in which said plugs are composed of curled hogs' hair bonded in a spongy mass by neoprene.

*6. A pad for lubricating journal bearings in railway journal boxes or the like, comprising a woven backing of textile material having wicking properties, a plurality of rows of spaced loops of textile material having wicking properties depending from said backing, said rows of loops being parallel to each other, the loops of each row being in alignment with each other in a horizontal plane and spaced apart to provide an oil space therebetween with the openings in said loops transverse to the alignment of the loops, and a separate plug of absorbent material disposed in and carried by each of said loops, said plugs being resilient and holding said loops extended.*

*7. A pad for lubricating journal bearings in railway journal boxes or the like, comprising a woven backing strip of textile material, a series of fabric loops, woven of yarn having wicking properties, attached to said backing strip and aligned along one axis of said backing strip, the openings of said loops extending in a direction transverse to the direction of alignment of said loops on said backing strip and forming a series of pockets having open sides, and resilient plugs having absorbent characteristics disposed in said pockets to hold the loops extended, said plugs also extending in the same direction as the openings formed by said loops and having end surfaces exposed at the respective open sides of said loops, said plugs being adapted to absorb oil from said journal box and to transfer the same to the fabric of said loops for wicking therealong, said backing strip being adapted to conform to the contour of the journal and extending beyond the open side of said loops.*

*8. A pad for lubricating journal bearings in railway journal boxes or the like, comprising a woven backing strip of textile material, a series of fabric loops, woven of yarn having wicking properties, woven into said backing strip and aligned along one axis of said backing strip, the openings of said loops extending in a direction transverse to the direction of alignment of said loops on said backing strip and forming a series of pockets having open sides, and resilient plugs having absorbent characteristics disposed in said pockets to hold the loops extended, said plugs also extending in the same direction as the openings formed by said loops and having end surfaces exposed at the respective open sides of said loops, said plugs being adapted to absorb oil from said journal box and to transfer the same to the fabric of said loops for wicking therealong, said backing strip being adapted to conform to the contour of the journal and extending beyond the open side of said loops.*

References Cited in the file of this patent or the original patent

UNITED STATES PATENTS

| | | |
|---|---|---|
| 91,000 | Devlan | June 8, 1869 |
| 2,049,225 | Ripley | July 28, 1936 |
| 2,264,250 | Shoemaker | Nov. 25, 1941 |
| 2,713,524 | Hagy | July 19, 1955 |
| 2,747,952 | Harkenrider | May 29, 1956 |
| 2,762,665 | Harkenrider | Sept. 11, 1956 |
| 2,807,803 | Rockwell | Sept. 24, 1957 |